June 29, 1937.  J. C. KARCHER  2,085,664
METHOD AND APPARATUS FOR DETERMINING POROSITY OF ROCK FORMATION
Filed Aug. 9, 1935  2 Sheets-Sheet 2
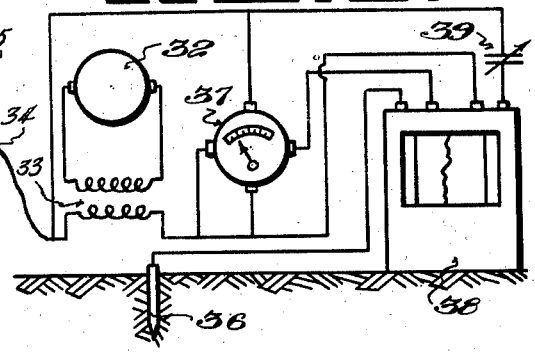
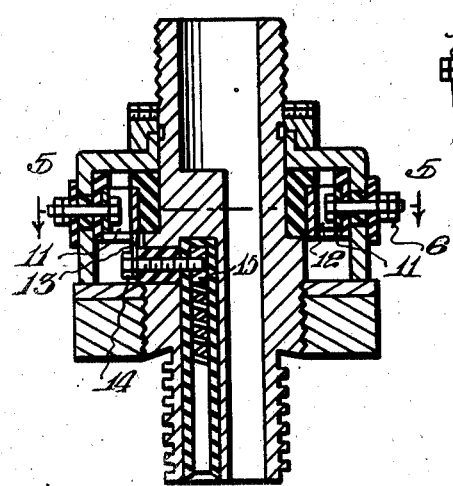
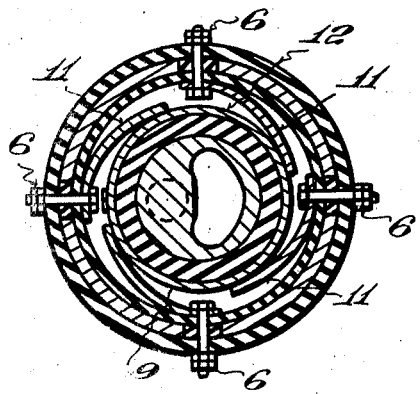
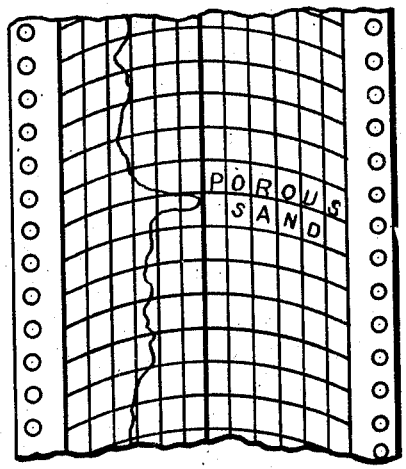
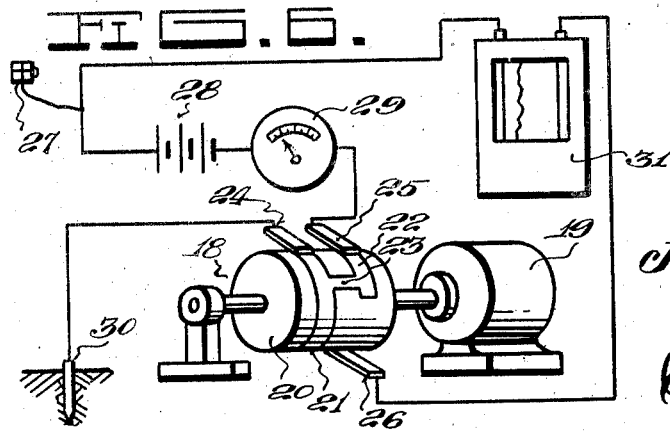
John C. Karcher
INVENTOR
ATTORNEY Patented June 29, 1937

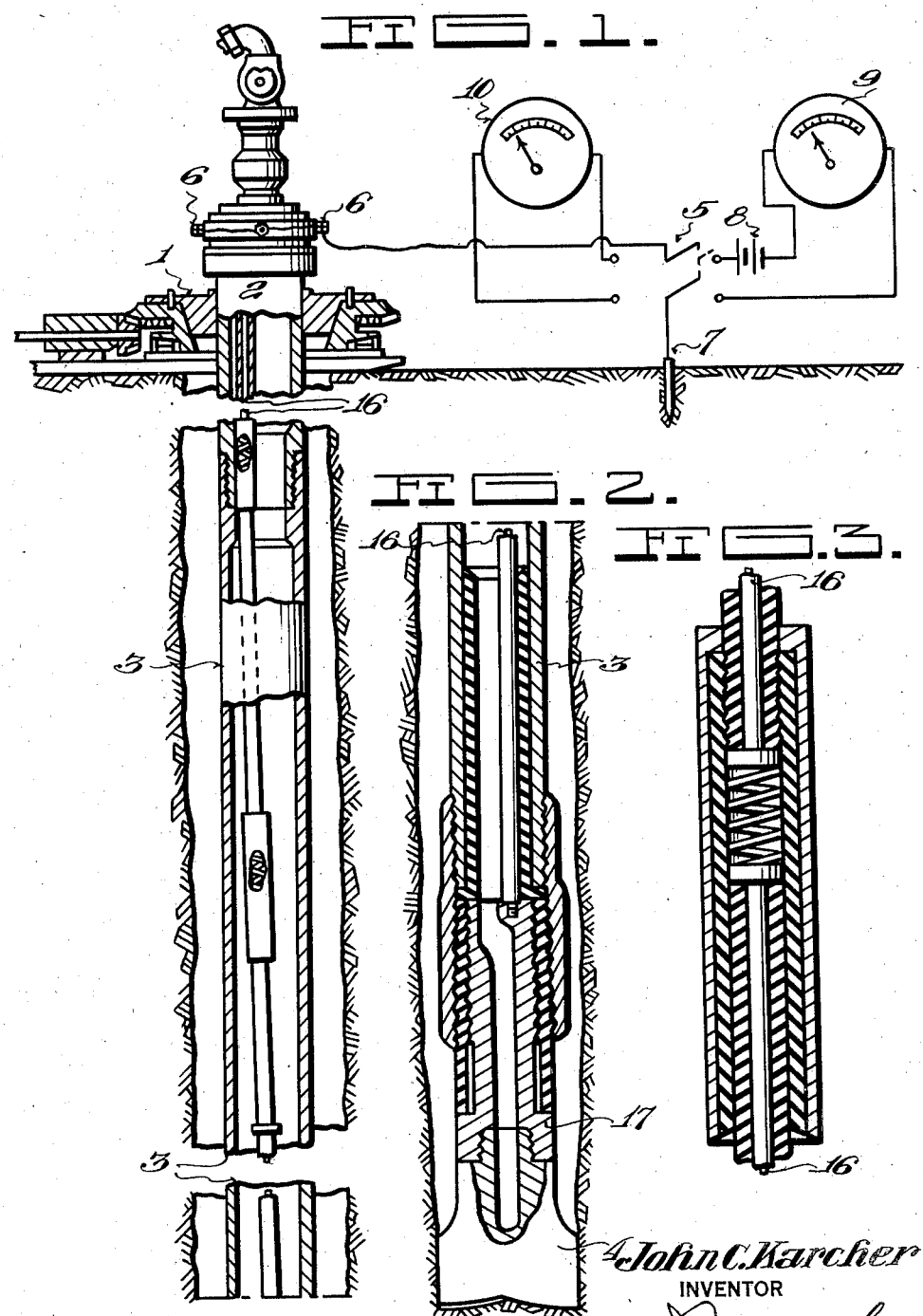

2,085,664

UNITED STATES PATENT OFFICE 2,085,664

METHOD AND APPARATUS FOR DETERMINING POROSITY OF ROCK FORMATIONS

John C. Karcher, Dallas, Tex., assignor to Geophysical Service, Inc., Dallas, Tex., a corporation of New Jersey Application August 9, 1935, Serial No. 35,431

5 Claims. (Cl. 175—182)

This invention relates to methods of determining porosity, and it has particular reference to an electrical method of determining the porosity of rock formations encountered by earth boring tools.

The principal object of the invention is the provision of a method whereby the porosity of formations encountered by a rotary drill bit may be continuously observed and recorded as drilling proceeds.

Another object of the invention is the provision of a method for determining the porosity of formations which utilizes the polarizing effect due to the passage of an electrical current from a metallic conductor into an electrolyte.

With the foregoing objects as paramount, the invention has particular reference to the various steps of the method which will become manifest as the description proceeds, taken in connection with the accompanying drawings, wherein:

Figure 1 is a diagrammatic view of one form of the invention, shown partly in vertical cross section.

Figure 2 is a continuation of Figure 1.

Figure 3 is a view in vertical section of one of the insulated connections.

Figure 4 is a sectional view of the apparatus for leading current into an insulated conductor within the drill stem.

Figure 5 is a view on the line 5—5 on Figure 4.

Figure 6 is a diagrammatic view of a modified form of the invention.

Figure 7 is a diagrammatic view of another modification of the invention, and

Figure 8 is a fragmentary view of a record of the relative porosities of formations encountered during the drilling operation.

It is a well known fact that the phenomenon of electrical conduction as occurring in the earth is, with few exceptions an electrolytic one; and therefore the degree of conductivity and its manner are affected by the porosity of the materials, since the amount of electrolyte held in the formations is determined by the porosity of the formation.

When a current is caused to pass from a metallic conductor into an electrolyte or into an electrolyte thence through a boundary into a second electrolyte of differing constituency, polarization at such boundaries will occur as a result of the passage of such current. This polarization makes itself evident as a counter E. M. F. which opposes the voltage used to cause the current to flow and will persist after the current inducing voltage is removed.

An explanation of this phenomenon is found in "Electrochemistry" by Creighton and Fink (1928) Vol. I, pages 242 and 243.

Since, as above mentioned, the electrical properties of these earth formations will be affected by their porosities, the phenomenon of polarization will also be affected by their porosities; and, consequently a measure of this polarization becomes a means of determining the amount of the porosity of the earth formation in question.

Referring primarily to Figure 1, 1 denotes a rotary table of a conventional rotary rig which serves to rotate a Kelly joint 2, which is threadably connected to a drill stem 3. The drill stem is connected to a bit 4, and is suitably insulated therefrom as shown. Various means may be employed for leading an insulated conductor through the drill stem to the drill bit, the method herein illustrated being an adaptation of that described in detail in the copending application, Serial No. 13,043.

A double pole, double throw switch 5 is wired as shown, one side being connected to the binding posts 6. The other side of the switch 5 is connected to a stake or ground 7.

The wiring on one side of the switch 5 is through a battery 8, and direct current ohmmeter 9. A voltmeter 10 is connected across the other side of the switch 5.

The binding posts 6 are electrically connected to a plurality of brushes 11 which are suitably insulated from the housing of the unit illustrated in detail in Figures 4 and 5. The brushes 11 serve to lead the current to a slip ring 12 which is connected through the conductor 13 and insulated bolt 14 to a conducting member 15 which, in turn has a spring connection with an insulated conductor 16. This conductor is comprised of sections which are joined by insulated connecting units illustrated in Figure 3. The lower end of the conductor 16 is threadably connected to a metallic drill connection 17 which is insulated from the drill pipe as shown in Figure 2. The drill bit 4 is threadably connected to the drill connection 17, thus completing the electrical circuit to ground.

In operation: the switch 5 is thrown so as to close the circuit through the battery 8 and ohmmeter 9, thereby allowing current to flow for some definite period, for example one minute, during which time the resistance to ground may be read in accordance with Patent No. 1,927,664. The switch 5 is then quickly thrown into the second position so as to close the drilling machine circuit through the voltmeter 10; which is then promptly read. The reading of this meter then becomes a means of determining the amount of polarization occurring as a result of having applied an original voltage to the drilling machine circuit.

The above operation is repeated as drilling proceeds, and may be performed automatically by means of a motor driven rotary switch, in which event the desired information may be recorded on a recording meter, the chart being driven either by a clock or in unison with the drilling mechanism. Figure 6 shows the manner in which this is accomplished. A rotary switch 18 is driven by a motor 19, and is comprised of an insulating body 20, a slip ring 21 and a segment 22 which is electrically connected to the slip ring 21 by the conductor 23. A brush 24 makes continuous contact with the slip ring 21, and the brushes 25 and 26 alternately make connection with the segment 22. When the segment 22 is in contact with the brush 25, the drilling machine circuit is closed from the binding post 27, (corresponding to the posts 6 shown in Figure 1) through a battery 28 and ohmmeter 29 to a ground 30, thus impressing the voltage of the battery upon the circuit. As the switch 18 rotates, the segment 22 breaks contact with the brush 25, thus opening the circuit through the battery 28. The segment 22 then makes contact with the brush 26, thus closing the drilling machine circuit through the recording meter 31 which indicates and records the polarization voltage generated in the drilling machine circuit as a result of having previously impressed the voltage of the battery 28 upon the circuit.

The rotary switch 18 is rotated at a sufficiently high rate of speed to cause the pointers of the meters 29 and 31 to remain substantially at rest. A direct current generator may be used instead of battery 28. The chart obtained by the use of the recording meter is illustrated in Figure 8.

The transient observed due to polarization is easily distinguished from any induced transient. In the case of a single circuit, the direction of the transient current when such current results from induction, (in this case self-induction) will be in the same direction as the original current; because the tendency of the electro-magnetic field (which is the source of the self-induced potentials) is to maintain the existing current. Therefore, the induced current will be in the same direction as the impressed current; whereas, the current resulting from polarization will be opposite in direction to that of the original current and therefore opposite in direction to any currents resulting from self-induction of the circuit. This is evidenced by the fact that it is necessary to reverse the polarity of the meter 10 with reference to the primary circuit. Furthermore, the self-inductance of the circuit is small, because of the fact that the distance of the stake 7 from the pipe 3 is very small compared to the depth of the hole.

Manifestly it is necessary that there be an interval of time between the interrupting of the connection between the brush 25 and ring segment 23 and time of making connection between the brush 26 and ring segment 23 in order to assure that there shall be no primary current from the battery 28 through the meter 31.

Evidence that the effect observed is due to polarization and not to self-inductance is indicated by the fact that when alternating current is used, the 90° out of phase component of current which results, is observed to be leading the impressed current and voltage instead of lagging the impressed voltage, as would be the case if the effect were due to induction. This fact has required the use of condenser 39. Since it is desired to measure only the quadrature component of current it is necessary to throw the field of the meter 38 into quadrature with the impressed voltage of the circuit.

The present invention can also be carried out by the use of alternating current as shown in Figure 7.

An alternating current generator 32 is employed to supply current to the primary of a transformer 33, the secondary of which is connected through wire 34 to a series of binding posts 35 (corresponding to the binding posts 6) on the periphery of the unit illustrated in detail in Figures 4 and 5. The circuit is completed to ground by means of a metallic stake 36, as illustrated in Figure 7.

When the alternating current generator 32 is operated during the drilling operation, an alternating current will flow through the circuit as described; and if there is no polarization at the bit this current will remain in phase with the applied voltage. If however, there is polarization at the bit, the counter E. M. F. resulting therefrom will produce in the alternating current circuit a quadrature component of current leading in phase the impressed voltage by 90°. When such a current is passed through the wattmeters 37 and 38, only the power or "in phase" current will tend to influence the readings of the wattmeter. If however, a condenser 39 or other suitable means is introduced into the voltage circuit of the wattmeters so as to shift the phase of the current in the field coils of the wattmeters into quadrature with the impressed voltage on the drilling machine circuit, then the wattmeters will read the amount of wattless or quadrature current in the drilling machine circuit, which current is the current resulting from polarization at the bit.

The method herein described is an improvement and addition to the method for measuring the resistance of the bit to ground, described in Patent No. 1,927,664. The two methods can be readily combined by simply adding two additional wattmeters having coils of the moving systems of the several wattmeters in series with the drilling machine circuit and with the field coils of the second pair of wattmeters energized without the introduction of a series condenser. The last two instruments, when calibrated in ohms will then read ground resistance; and the first two will read polarization. The entire data can be read on a single recorder with two recording elements.

The quadrature current for energizing the field of the wattmeters may also be obtained by using a single-phase generator as above described, instead of a two-phase generator, wherein the two phases of the generator are 90° apart.

By supplying current to the drilling machine circuit from one phase and energizing the field coils of the wattmeters from the other phase, the desired quadrature relationship between wattmeter field and the drilling machine current may be obtained for observing the quadrature component of current in the drilling machine circuit.

Manifestly, the construction of the apparatus and the steps of the method described herein are capable of considerable modification and such modification as is considered within the scope and meaning of the appended claims is also considered within the spirit and intent of the invention.

What is claimed is:

1. A method for determining the porosity of sub-surface rock formations which consists in causing a current to flow through an insulated conductor within the drill stem of a rotary drilling machine to a drill bit insulated from said drill stem, and in measuring the amount of electrical polarization resulting therefrom.

2. A method for determining the porosity of sub-surface rock formations which consists in measuring the amount of polarization resulting from causing a direct current to pass through the drill bit of a rotary drilling machine into the ground.

3. Apparatus for determining the porosity of a sub-surface earth formation encountered by a rotary drill bit while drilling proceeds, comprising means for causing a direct current voltage to be impressed upon the earth formation between the drill bit and surface of the ground, means for causing said current to flow for a fixed interval of time, means for suddenly removing the voltage which causes said current to flow, and means for measuring and recording the polarization voltage resulting therefrom.

4. Apparatus for determining the amount of polarization resulting from causing an alternating current to flow through the drill bit of a rotary drilling machine while drilling proceeds, comprising in combination an alternating current generator connected through insulating conductors whereby to cause current to flow through the bit of said rotary drilling machine to ground; means for measuring the amount of current generated in the circuit which is 90° out of phase with the impressed voltage, and means for recording said out of phase current.

5. Apparatus for determining the porosity of a sub-surface rock formation including in combination, an alternating current generator, a rotary drilling machine having an insulated conductor within the drill stem thereof, said conductor being connected to a bit insulated from said drill stem, means for passing an alternating current from said generator through said drill bit into the ground, and means for measuring the amount of current in the circuit which is 90° out of phase with the voltage impressed upon the circuit.

JOHN C. KARCHER.